Figure 1:
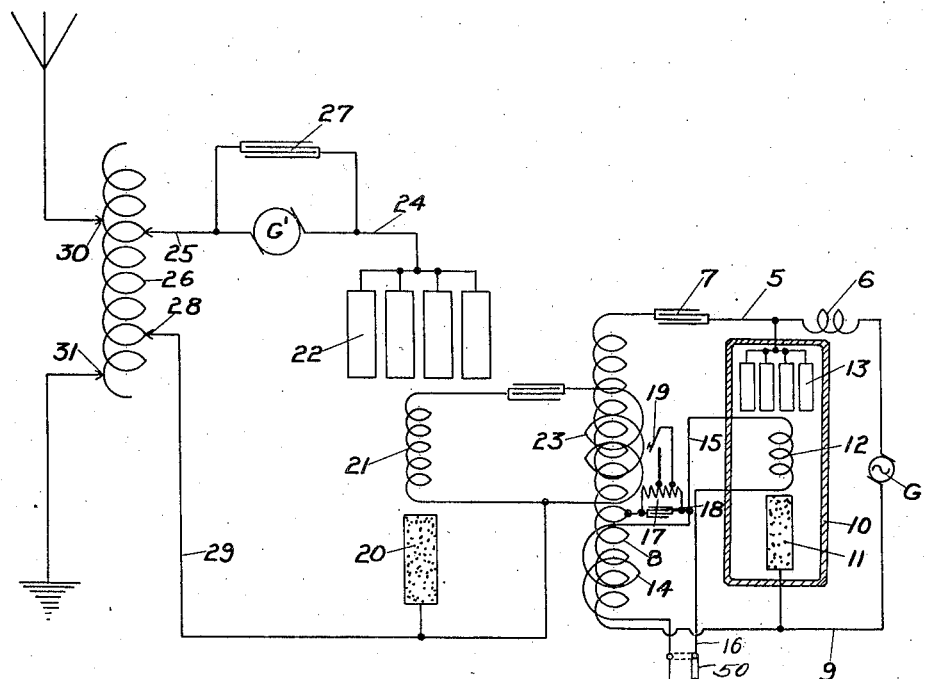

Dec. 14, 1926.

F. S. McCULLOUGH 1,610,561

POWER AMPLIFYING CIRCUIT

Filed Dec. 11, 1922

WITNESSES:
R. J. Butler.
H. L. Godfrey

INVENTOR
Frederick S. McCullough.
BY
Wesley G. Carr
ATTORNEY

Patented Dec. 14, 1926.

1,610,561

UNITED STATES PATENT OFFICE.

FREDERICK S. McCULLOUGH, OF WILKINSBURG, PENNSYLVANIA.

POWER-AMPLIFYING CIRCUIT.

Application filed December 11, 1922. Serial No. 606,347.

This invention relates to power-amplifying circuits and particularly to those circuits using thermionic tubes, especially tubes of the kind shown and described in my copending application Serial No. 606,345 filed Dec. 11, 1922, for improvement in vacuum tubes.

In my co-pending application above noted, I have described a space-discharge device in the form of a vessel having an anode and a cathode and, preferably, though not essentially, a grid.

The device is peculiar in that the cathode is inductively heated by means of an oscillating field in which it is located, the field preferably oscillating at radio-frequency, the said application disclosing a circuit in which the cathode is disposed in a field with a coil through which pass radio-frequency currents generated in the circuit by the tube itself.

According to my present invention, I employ a similar tube as an amplifier in a transmission system wherein the radio-frequency impulses for heating the cathode are generated in an initial or modulating circuit having current or voltage variations which are to be amplified.

My invention may best be understood by reference to the accompanying drawing which illustrates embodiments of the invention. In the drawing, Figure 1 is a diagrammatic view showing my invention embodied in a circuit such as might be employed in a radio broadcasting station; and Fig. 2 is a similar view showing another circuit embodying the invention.

Figure 2:
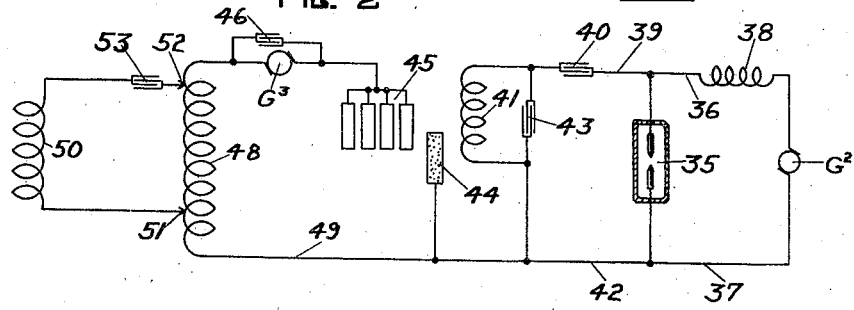

In Fig. 1 is shown an alternating-current source G which is included in a regenerative circuit comprising a line 5 having a choke coil 6 and a condenser 7 therein, an inductance coil 8, and a line 9. Connected across the lines 5 and 9 is a three-element vacuum tube 10, the tube being connected to the line 5 between the choke coil and the condenser. While a tube of usual form may be employed, I prefer to employ a tube having a cathode 11, a grid 12 in the form of a coil in inductive relation to the cathode, and a plate or anode 13 formed of several segments operatively disposed about the coil, as described in my copending application hereinbefore referred to.

The wire 16 includes a switch 50 by means of which it may be connected directly to the wire 15 or to the high frequency source 51.

In the beginning of the operation of the device, high frequency currents from the source 51 flow in the coil 12 and cause eddy currents, by induction, in the cathode 11. The cathode is thus heated so that it gives off electrons. The anode 13 is not heated to the same extent because its division into a number of separate plates prevents the formation of eddy currents to a sufficient extent.

The source of potential G, when it causes the plate 13 to serve as an anode, enables the tube 10 and its associated connections to act as a generator of high frequency currents, as explained below. During the half cycle when the plate 13 is not an anode, the tube 10 is practically an insulator and generates no oscillations. The frequency of the source G thus determines a periodic modulation of the oscillations developed which may, if desired, fix the pitch of the signals.

Connecting the coil 8 and the line 15 is a grid leak 17 and a grid condenser 18 which is connected in parallel to the grid leak. In a transmitting apparatus, a modulating key 19, or other current-interrupting device, indicated by dotted lines, may be put in the grid leak circuit.

The present invention proposes to utilize the above-described circuit, or any other suitable oscillating circuit, in a novel high-power system. To this end, I provide a second space-discharge device of the kind described, having a cathode 20, a grid 21 and an anode or plate 22 formed of a plurality of segments, whereby inductive heating is reduced. The grid 21 is in the form of a coil, and the cathode is in transformer relation thereto, whereby the lines of force surrounding the coil induce currents therein as in the tube 10.

The grid or coil 21 is inductively coupled to the modulator or initial circuit by a coil 23 inductively positioned with respect to coil 8. Radio-frequency oscillations generated in the coil 8 set up corresponding oscillations in the coil 23 and, consequently, in the coil 21. The resultant radio-frequency alternating field heats the cathode 20.

The second space-discharge device is included in a circuit of any desired nature, including a source of power $G^1$. The circuit disclosed is a radio circuit. In the circuit shown, the anode 22 is connected, through a line 24, to one terminal of the generator $G^1$. The other terminal of the generator is adjustably connected, through a line 25, to an inductance coil 26. Shunted across the generator $G^1$ is a condenser 27. An adjustable contact 28 leads from the coil 26 to the cathode and to the grid, through a conductor 29. An adjustable aerial connection is designated 30, and an adjustable ground circuit is designated 31.

In operation, amplification in the aerial circuit is effected in the same manner as if an ordinary three-element incandescent vacuum tube were used in place of the space-discharge device 20, 21, 22. The radio-frequency current in the grid 21 serves to heat the cathode.

The high frequency currents in the coil 21 produce a high frequency alternating magnetic field which, at its maximum, is sufficient to cause the electrons from the cathode 20 to move in curved paths without reaching the plate 22. When the magnetic field is smaller or zero, the electrons travel directly to the plate 22. Fluctuations in the plate current of a high frequency are thus produced. Thus, the second circuit, which is the circuit including the second space-discharge device, is controlled by the first circuit or modulating circuit and the second circuit amplifies the characteristics of the first circuit. If, for instance, the second circuit includes a high-power generator for maintaining a continuous-wave emission from an aerial, the oscillations radiated from the aerial will be directly controlled by the initial or modulating circuit.

When the switch 19 is closed, the effective resistance of the leak around the condenser 17 is diminished. When this switch is open, the resistance of this leak returns to its original value. The effect of the condenser and leak upon the behavior of the tube 10 and its associated circuits is thus altered. In one position of the switch the tube and its circuits produce oscillations. In the other position they either produce no oscillations or give oscillations of greatly diminished amplitude. The signaling is thus accomplished by manipulating the switch 19.

The invention, however, is not limited to the application just disclosed or to the particular circuits employed.

In Fig. 2, I have illustrated a different embodiment of the invention for utilizing the same principles of amplification.

In Fig. 2, the first circuit for generating radio-frequency oscillations is an arc circuit, generally referred to as the Poulsen arc circuit. This circuit, having certain constants determined by the frequency of the oscillations to be generated, includes a source of power, such as a direct-current generator $G^2$. The generator is connected across a quenched arc 35, through lines 36 and 37, the line 36 including a choke coil 38. Shunted around the arc is an oscillating circuit including a line 39 in which is a condenser 40, a coil 41 and line 42. A condenser 43 is indicated as connected across the coil 41.

In this circuit, which is well known, a charge accumulates on the condenser 40, which periodically discharges across the gap, setting up an oscillating current in the coil 41. By proper adjustment of the circuit, it may oscillate at any desired radio frequency.

The coil 41 is utilized as the grid and primary heating coil of a space-discharge device having, in addition, a cathode 44 and a plate or anode 45. The radio-frequency oscillations in the coil 41 inductively heat the cathode. The space-discharge device is included in a power circuit of a suitable kind. As shown, the power circuit includes a generator $G^3$ connected, at one side, to the anode 45. Shunted around the generator $G^3$ is a condenser 46. The other side of the generator connects, through a line 49, an inductance device 48 and a line 49, to the cathode 44 and the grid or coil 41.

An inductance coil 50 for any suitable use may be connected to the coil 48, through variable contacts 51 and 52, a condenser 53 being shown in the circuit. It is obvious that aerial and ground connections could be substituted for the inductance coil 50, as is illustrated in Fig. 1, the circuits depending upon the use to which the invention is applied.

As the coil 41 is a grid for the space-discharge device, (as well as a means for inductively heating the cathode, the current-flow across the space-discharge device will be controlled in accordance with the oscillations generated in the first or arc circuit. By combining a radio-frequency arc oscillator with a triode employed as a power amplifier, I have devised a novel source of radio-frequency power currents in which it has been found that the arc operates more steadily and at higher frequencies in the combination than in other circuits known heretofore.

I claim as my invention:

1. In a system of amplification, a primary circuit for generating an oscillating current, a second circuit including a source of power and a space-discharge device, said space-discharge device having an inductively heated cathode, means electrically connected in said primary circuit for maintaining an oscillating field about said cathode for inductively heating the same, the difference of potential across said space-discharge device and the amplitude of said oscillating field being of such relative magnitude that the current through said space-discharge device is modulated in accordance with the current in said primary circuit.

2. In a system of amplification, a primary circuit for generating an oscillating current, said circuit including a coil, a second circuit including a source of power and a space-discharge device having an anode and a cathode, the latter being adapted to be inductively heated, said coil in the primary circuit being disposed around and in transformer relation to the cathode for inductively heating the cathode, the oscillating currents of the primary circuit also being utilized to control the current-flow between the anode and cathode in the space-discharge device of the second circuit.

3. In a system of amplification, a primary circuit for generating an oscillating current, said circuit including a coil, a second circuit including a source of power and a space-discharge device having an anode and a cathode, the latter being adapted to be heated inductively, said cathode being disposed in transformer relation to said coil in the primary circuit whereby it is heated inductively when oscillating currents in the primary circuit are passed through said coil, said coil also being disposed in grid relationship with the anode and cathode of said space-discharge device whereby the flow of current in the second circuit is controlled by the current-flow in said coil.

4. In a system of amplification, a primary circuit for generating currents oscillating at radio frequency, a second circuit including a source of power and a space-discharge device, said space-discharge device having an inductively heated cathode, means electrically connected in the primary circuit for maintaining a field oscillating at radio frequency about the cathode for inductively heating said cathode, and means for utilizing the radio-frequency oscillations for controlling the current flow of the second circuit across said space-discharge device.

5. In a system of amplification, a primary circuit in which radio-frequency oscillations may be generated, said circuit including a coil, a second circuit including a space-discharge device having an anode and a cathode, the latter being adapted to be heated inductively, said cathode being disposed in transformer relation to said coil in the primary circuit whereby it is inductively heated when radio-frequency currents are passed through the coil, said coil also being disposed in grid relation to the cathode and the anode of said space-discharge device, whereby the flow of current in the second circuit is controlled by the current flow in said coil.

6. In a system of amplification. a primary circuit including a source of power, a space-discharge device and an inductance coil connected in such manner that the space-discharge device operates as a generator of radio-frequency currents in the inductance coil, said space-discharge device having an inductively heated cathode, means coupled in said primary circuit whereby radio-frequency impulses generated in the circuit maintain an oscillating field about said cathode to inductively heat the same, a second circuit including a second space-discharge device having an inductively heated cathode, a source of power in said second circuit and means whereby radio-frequency currents generated in the first circuit may be utilized to inductively heat the cathode of said second space-discharge device and means for utilizing the currents generated in the first circuit in controlling the current-flow through said space-discharge device in the second circuit.

In testimony whereof, I have hereunto subscribed my name this 7th day of December, 1922.

FREDERICK S. McCULLOUGH.